United States Patent [19]
van der der Heijden et al.

[11] Patent Number: 5,630,992
[45] Date of Patent: May 20, 1997

[54] ANTI-CAKING AGENTS FOR AMMONIUM THIOCYANATE

[75] Inventors: Antonius E. D. M. van der der Heijden, Den Haag; Gerda M. van Rosmalen; Marielle G. M. van der Horst, both of Delft, all of Netherlands

[73] Assignee: Akzo Nobel NV, Netherlands

[21] Appl. No.: 519,222

[22] Filed: Aug. 25, 1995

[30] Foreign Application Priority Data

Aug. 29, 1994 [EP] European Pat. Off. ............. 94202452

[51] Int. Cl.$^6$ .................................................. C01C 3/20
[52] U.S. Cl. ............................................. 423/268; 423/366
[58] Field of Search ......................... 423/268, 366

[56] References Cited

U.S. PATENT DOCUMENTS

| | | | |
|---|---|---|---|
| 2,788,280 | 4/1957 | Rust et al. | 423/268 |
| 4,917,919 | 4/1990 | Geisler | 427/220 |

FOREIGN PATENT DOCUMENTS

| | | | |
|---|---|---|---|
| 1383718 | 2/1975 | Australia | C01C 1/18 |
| 0048226 | 3/1982 | European Pat. Off. | C05G 3/00 |
| 0081008 | 6/1983 | European Pat. Off. | C05G 3/00 |
| 0301344 | 1/1989 | European Pat. Off. | B01J 2/30 |
| 1004152 | 3/1957 | Germany . | |
| 1157600 | 11/1963 | Germany . | |
| 2452078 | 5/1976 | Germany | C01C 3/20 |
| 280093A1 | 6/1990 | Germany | C01C 1/18 |
| 4126805 | 2/1993 | Germany | 423/268 |
| 255055 | 11/1991 | Japan | 423/366 |
| 209425 | 1/1968 | Russian Federation | 423/268 |
| 632651 | 11/1978 | Russian Federation | 423/268 |
| 755516 | 8/1956 | United Kingdom . | |
| 876675 | 9/1961 | United Kingdom . | |
| 897642 | 5/1962 | United Kingdom | 423/268 |

OTHER PUBLICATIONS

European Search Report dated Jan. 18, 1995.
*British Chemical Engineering*, Phoenix, L., vol. 11, No. 1, pp. 34–38 (1966).
*Powder Technology*, Chen, Y.L. et al., vol. 77, pp. 1–6 (1993).
Derwent Abstract 92–062934.

*Primary Examiner*—Wayne Langel
*Attorney, Agent, or Firm*—Ralph J. Mancini; Louis A. Morris

[57] ABSTRACT

A composition comprising ammonium thiocyanate and an amount of an anti-caking agent selected from amines and amine salts, which is effective to reduce the caking of the ammonium thiocyanate, is disclosed. Also disclosed is a method for reducing the caking of a composition which contains ammonium thiocyanate which comprises the step of incorporating in said composition, 0.0001–1.0% by weight, based on the weight of the ammonium thiocyanate, of an anti-caking agent selected from amines and amine salts and the use of a compound selected from amines and amine salts, as an anti-caking agent for ammonium thiocyanate. It has surprisingly been found that minor amounts of these anti-caking agents provide an excellent reduction in the caking of ammonium thiocyanate compositions.

11 Claims, No Drawings

5,630,992

ANTI-CAKING AGENTS FOR AMMONIUM THIOCYANATE

FIELD OF THE INVENTION

The present invention relates to the use of amines and amine salts as anti-caking agents for ammonium thiocyanates, ammonium thiocyanate compositions containing such anti-caking agents and to a method of reducing the caking of ammonium thiocyanate by incorporating such anti-caking agents therein.

BACKGROUND OF THE INVENTION

Ammonium thiocyanate, also known as ammonium rhodanide, suffers from a caking problem which has been known in the art for a long time. For example, German patent application 2,452,078 from 1974 relates to a process for the reduction of caking in rhodanide products including ammonium thiocyanate. This publication groups ammonium rhodanide, alkali metal rhodanides, alkaline earth metal rhodanides and quaternary ammonium rhodanides together as a single class of materials with regard to the problem of caking.

As a solution to the caking problem for these rhodanides is proposed the addition of a mixture of sodium sulfate and silicon dioxide to the rhodanide. In the examples it is demonstrated that the caking of sodium rhodanide is reduced by addition of a mixture of 1.0 weight percent sodium sulfate and 1.0 weight percent silicon dioxide. However, no further examples with other rhodanides are given in this publication.

An important disadvantage of the solution proposed in this German patent application is that it is generally undesirable to incorporate two weight percent of anti-caking agent in such products since this results in less product per pound for the customer and it adds a significant impurity which can cause problems in the application of such products.

From the article, "How Trace Additives Inhibit the Caking of Inorganic Salts," Phoenix, L., British Chemical Engineering, Vol. 11, No. 1, pp. 34–38 (1966), it can be seen that anti-caking is an empirical art such that one cannot predict from a successful test with one compound that a particular anti-caking agent will work with other compounds. In particular, this publication tests the anti-caking agent ammonia triacetamide [$N(CH_2CONH_3)_2$] for its anti-caking effect on sodium chloride, sodium bromide, potassium chloride and ammonium chloride, among others. The anti-caking effects of ammonia triacetamide were very good, good, none and none, respectively, in these four tests.

More recently, an attempt has been made to determine the relationship between anti-caking effectiveness and crystal growth in the article, "Selection of Anti-Caking Agents Through Crystallization," Chen, Y. L. et al., Powder Technology, Vol. 77, pp. 1–6 (1993). From the article it is apparent that crystal growth is, in some way, related to caking.

However, the conclusion of this article was limited to the statement that performing experiments on crystal growth inhibition gives a better indication of anti-caking effectiveness than caking tests and no clear relationship between the two phenomena was formulated. Thus, even in 1993 anti-caking remains an empirical art where trial and error plays an important role in the search for effective anti-caking agents.

Fatty amines are known to be anti-caking agents from Anonymous Research Disclosure 1980, 189, 31 (England) wherein fatty amines such as tallow amine and stearyl amine are employed as anti-caking agents for pulverent substances such as fertilizers. This publication also discloses a number of other, substituted fatty amines such as hydroxylated and alkoxylated amines, also for use as anti-caking agents for pulverent substances. However, ammonium thiocyanates are not men- tioned in this publication.

Further, East German Patent DD 280,093 discloses the use of fatty acids or fatty amines as an anti-caking coating for ammonium nitrate. A $C_{12}$–$C_{20}$ fatty amine is also exemplified in this patent. Soviet Union patent publication 1,650,648 discloses an anti-caking agent for potassium chloride which contains salts of higher fatty amines in admixture with one or more fatty acids.

Finally, European Patent Application 0 048 226 discloses an anticaking agent which comprises inorganic powder, wax and mixtures of cationic amines and fatty acids. This anti-caking agent may be used in fertilizers. The amines mentioned in the text are fatty amines having at least one $C_{12}$ or longer alkyl chain.

None of these publications teach or suggest the present invention. Further, in view of the empirical nature of anti-caking, one cannot predict that these amine anti-caking agents will work for ammonium thiocyanate from the information provided in these publications.

The present invention is directed to solving the problem of caking of ammonium thiocyanates. In this regard, the present inventors have sought an anti-caking agent which provides effective anti-caking when added to ammonium thiocyanate in low concentrations. In this manner, the cost of the product is not negatively impacted by addition of the anti-caking agent, nor is there a significant impurity introduced into the ammonium thiocyanate product.

These and other objects of the invention will be apparent from the summary and detailed description of the invention which follow.

SUMMARY OF THE INVENTION

The invention relates to a composition comprising ammonium thiocyanate and an amount of an anti-caking agent selected from amines and amine salts, which is effective to reduce the caking of the ammonium thiocyanate.

In a second aspect, the present invention also relates to a method for reducing the caking of a composition which contains ammonium thiocyanate which comprises the step of incorporating in said composition, 0.0001–1.0% by weight, based on the weight of the ammonium thiocyanate, of an anti-caking agent selected from amines and amine salts.

In a third aspect, the present invention also relates to the use of a compound selected from amines and amine salts, as an anti-caking agent for ammonium thiocyanate.

DETAILED DESCRIPTION OF THE PREFERRED EMBODIMENTS

The present invention provides a means for reducing the caking of ammonium thiocyanate. Thus, it can be applied to compositions which contain a significant amount of ammonium thiocyanate therein.

The anti-caking agents useful in the ammonium thiocyanate compositions of the present invention are selected from amines and amine salts. More preferably, the anti-caking agents are selected from alkyl amines, hydroxylated amines, alkoxylated amines and salts thereof.

Examples of such anti-caking agents include, but are not limited to, linear or branched $C_1$–$C_{30}$ alkyl amines, ethoxylated amines, propoxylated amines, ethoxylated/propoxylated amines, ethoxylated alkyl amines, propoxylated alkyl amines, ethoxylated/propoxylated alkyl amines, and salts thereof. Such salts may include alkali metal salts and alkaline earth metal salts. The most preferred amines for use in the compositions of the present invention are $C_8$–$C_{20}$ linear alkyl amines such as dodecyl amine, tallow amine, stearyl amine, cocoamine and octadecyl amine. The most preferred anti-caking agent for use in the present invention is dodecyl amine.

The amount of the anti-caking agent which is employed in the compositions of the present invention is from 0.0001–1.0% by weight, based on the weight of the ammonium thiocyanate. More preferably, 0.0005–0.5% by weight, based on the weight of the ammonium thiocyanate, is employed.

The compositions of the present invention may be prepared by the process of the present invention whereby the anti-caking agent is incorporated into the ammonium thiocyanate composition in any known manner such as mixing. It is also possible to incorporate the anti-caking agent into the ammonium thiocyanate during one of the steps of producing and/or packaging the ammonium thiocyanate. Known mixing methods can be employed as long as relatively homogeneous mixing of the anti-caking agent with the ammonium thiocyanate is obtained.

In the process of the present invention, the same types and amounts of anti-caking agents may be employed as are employed in the ammonium thiocyanate compositions of the present invention. Further, in both the process and the compositions of the invention, the usual additives normally employed in ammonium thiocyanate compositions may also be present.

Finally, the present invention also relates to the use of the above-described anti-caking agents to reduce the caking of ammonium thiocyanate compositions. Again, the types and amounts of the anticaking agents employed in this use are the same as are employed in the compositions of the present invention.

For the purpose of this application, a reduction in caking is defined as an improvement in the result obtained in the so-called, "breaking test" which is hereinafter defined, as compared to the result obtained for the same composition in the absence of the anti-caking agent.

The present invention will now be further illustrated by the following examples.

METHODS EMPLOYED IN THE EXAMPLES

The Breaking Test

In this test, a cylinder is filled with ammonium thiocyanate and, if applicable, the given amount of anti-caking additive and placed under a pressure of 0.1 kg/cm² for a period of several days at a temperature of 20°–22° C. and a relative humidity of 50–60%. At incremental periods, samples of the material are removed from the cylinder and pressure is applied until the caked material is diametrically broken. The pressure required to diametrically break the caked material is measured and is given in the tables below. A reduction in caking is indicating by a lower pressure being required to break the caked material.

Example 1 and Comparative Examples A–C

To make compositions containing ammonium thiocyanate or sodium thiocyanate and an anti-caking agent, the ammonium thiocyanate or sodium thiocyanate is placed in a container, the amount of anti-caking agent given below is added and the container is shaken until the anti-caking agent is thoroughly mixed with the material.

These samples of sodium thiocyanate and ammonium thiocyanate were subjected to the breaking test. The control examples contained no anti-caking additive and the remaining examples contained 0.5 weight percent of dodecylamine anti-caking agent. The results are given in Table 1.

TABLE 1

| | | Pressure Applied (kg) Caking Time (days) | | | |
|---|---|---|---|---|---|
| Example | Content of Cylinder | 0 | 1 | 3 | 8 |
| A | NaSCN Control | 0.00 | 0.40 | 0.65 | 1.80 |
| B | NaSCN & Additive | — | — | — | — |
| C | NH₄SCN Control | 0.00 | 0.03 | 0.10 | 0.12 |
| 1 | NH₄SCN & Additive | — | — | 0.00 | 0.00 |

From Table 1 it can be seen that dodecylamine is an effective anti-caking agent for ammonium thiocyanate ($NH_4SCN$) but not for sodium thiocyanate (NaSCN). This reinforces the conclusion that the selection of an effective anti-caking agent is an empirical process.

Examples 2–5 and Comparative Example D

Samples of ammonium thiocyanate prepared by the method of Example 1 were subjected to the breaking test. The control example (Comparative Example D) contained no anti-caking additive. Examples 2–5 contained varying amounts of dodecylamine anti-caking agent. The caking was measured after a period of three days using the breaking test. The results are given in Table 2.

| Example | Amount of Additive (wt %) | Pressure (kg) |
|---|---|---|
| D | 0.00 | 0.10 |
| 2 | 0.03 | 0.00 |
| 3 | 0.05 | 0.00 |
| 4 | 0.10 | 0.00 |
| 5 | 0.20 | 0.00 |

These tests demonstrate that different amounts of dodecylamine still give an improvement in the caking of ammonium thiocyanate.

Examples 6–7

In these examples, compositions of ammonium thiocyanate were prepared by the same method as was used in Example 1 using two different anti-caking additives, dodecyl amine and octadecyl amine. The amount of anti-caking additive employed is given in Table 3. Two kilograms of each of these compositions were placed in a cylinder under a pressure of 0.1 kg/cm² for a period of 11 days at a temperature of 19°–26° C. and a relative humidity of 30–50%. From each cylinder were taken three 5×5×5 cm. cubic samples of material and these samples were diametrically broken by application of pressure. The highest and the average amount of pressure required to break each of the sets of three samples are given below in Table 3.

TABLE 3

| Additive Concentration (weight percent) | Dodecyl Amine | | Octadecyl Amine | |
| --- | --- | --- | --- | --- |
| | Highest Pressure (Kg) | Average Pressure (Kg) | Highest Pressure (Kg) | Average Pressure (Kg) |
| 0.0000 | 1.36 | 0.72 | 1.36 | 0.72 |
| 0.0025 | 0.44 | 0.26 | 0.86 | 0.55 |
| 0.0050 | 1.12 | 0.70 | 0.60 | 0.36 |
| 0.0075 | 0.22 | 0.16 | 1.48 | 0.79 |
| 0.0100 | 0.26 | 0.20 | 0.94 | 0.52 |
| 0.0200 | 0.26 | 0.20 | 0.26 | 0.19 |
| 0.0300 | 0.26 | 0.22 | 0.80 | 0.39 |

From Table 3 it can be seen that both dodecyl amine and octadecyl amine provide a significant anti-caking effect for ammonium thiocyanate over a wide range of concentrations.

Examples 8–9

In these examples, to 5 kilograms of freshly produced ammonium thiocyanate was added crumbled dodecyl amine or octadecyl amine in a Forberg mixer and mixed for a period of two minutes. The mixed material was stored in bags for three months under an approximate storage pressure of 0.03 kg/cm$^2$. When the bags were opened there were only a few lumps of the material with the rest still being free-flowing. The lumps of material were removed and 5×5×5 cm. cubic samples were cut off and subjected to the breaking test to determine their yield strength. The amount and type of each additive, as well as the results of the breaking test are given below in Table 4.

TABLE 4

| Additive Concentration (weight percent) | Dodecyl Amine | | Octadecyl Amine | |
| --- | --- | --- | --- | --- |
| | Highest Pressure (kg) | Average Pressure (kg) | Highest Pressure (kg) | Average Pressure (kg) |
| 0.0000 | 0.25 | 0.16 | 0.25 | 0.16 |
| 0.0005 | 0.10 | 0.08 | 0.19 | 0.13 |
| 0.0100 | 0.00 | 0.00 | — | — |

— = not measured.

From Table 4 it can be seen that both dodecyl amine and octadecyl amine provide a significant anti-caking effect for ammonium thiocyanate under actual storage conditions.

The foregoing examples were presented for the purpose of illustration and description only and are not to be construed as limiting the invention in any way. The scope of the invention is to be determined from the claims appended hereto.

We claim:

1. A composition comprising ammonium thiocyanate and an amount of an anti-caking agent selected from the group consisting of amines and amine salts, which is effective to reduce the caking of the ammonium thiocyanate.

2. The composition of claim 1 which comprises 0.0001–1.0% by weight, based on the weight of the ammonium thiocyanate, of the anti-caking agent.

3. The composition of claim 1 wherein the anti-caking agent is selected from the group consisting of alkyl amines, hydroxylated amines, alkoxylated amines and salts thereof.

4. The composition of claim 3 wherein the anti-caking agent is selected from the group consisting of C8–C20 alkyl amines.

5. The composition of claim 1 which comprises 0.0005–0.5% by weight, based on the weight of the ammonium thiocyanate, of the anti-caking agent.

6. The composition of claim 1 wherein said anti-caking agent is selected from the group consisting of dodecyl amine, tallow amine, stearyl amine, cocoamine, octadecyl amine and mixtures thereof.

7. A method for reducing the caking of a composition which contains ammonium thiocyanate which comprises incorporating into said composition, 0.0001–1.0% by weight, based on the weight of the ammonium thiocyanate, of an anti-caking agent selected from the group consisting of amines and amine salts.

8. The method of claim 7 wherein the anti-caking agent is selected from the group consisting of alkyl amines, hydroxylated amines, alkoxylated amines and salts thereof.

9. The method of claim 8 wherein the anti-caking agent is selected from the group consisting of C8–C20 alkyl amines.

10. The method of claim 7 wherein the anti-caking agent is employed in an amount of 0.0005–0.5% by weight, based on the weight of the ammonium thiocyanate.

11. The method of claim 7 wherein said anti-caking agent is selected from the group consisting of dodecyl amine, tallow amine, stearyl amine, cocoamine, octadecyl amine and mixtures thereof.

* * * * *